United States Patent

[11] 3,596,321

[72] Inventor Hartmut Upmeier
Tecklenburg, Germany
[21] Appl. No. 864,291
[22] Filed Oct. 2, 1969
[45] Patented Aug. 3, 1971
[73] Assignee Windmoller & Holscher
Munsterstr, Lengerich, Germany
[32] Priority Oct. 10, 1968
[33] Germany
[31] P 18 02 288.3

[54] GAUGING OR CALIBRATING DEVICE FOR TUBULAR FILMS
10 Claims, 5 Drawing Figs.
[52] U.S. Cl. .................................................. 18/14 A
[51] Int. Cl. .................................................. B29d 23/00
[50] Field of Search ...................................... 18/14 A, 14 R, 14 G, 14 S, 19 F, 19 TM

[56] References Cited
UNITED STATES PATENTS
1,679,350 8/1928 Dickey .......................... 18/14 G
2,502,312 3/1950 Danner .......................... 18/14 A X Primary Examiner—J. Spencer Overholser
Assistant Examiner—Norman E. Lehrer
Attorney—Arthur O. Klein ABSTRACT: A gauging or calibrating device for tubular films formed by a blowing process comprises a plurality of support rings surrounding the tubular film in a zone where the film is still plastic. Each support ring, which may be divided in one or two places is formed from a curved spindle and a heat-resistant and nonadhesive covering which can rotate on the spindle. The covering can be formed either from a flexible tube mounted on support rollers, or it can be formed by a number of closely spaced individual rollers. The ends of the curved spindle are held in adjustable mounts which permit the diameter of the support ring to be adjusted.

INVENTOR
Hartmut UPMEIER
By
Arthur O. Klein
his ATTORNEY

PATENTED AUG 3 1971 3,596,321

INVENTOR
Hartmut UPMEIER

By

Arthur O. Klein his ATTORNEY

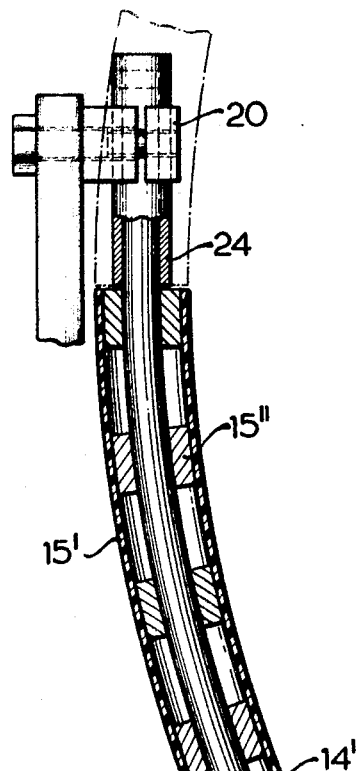
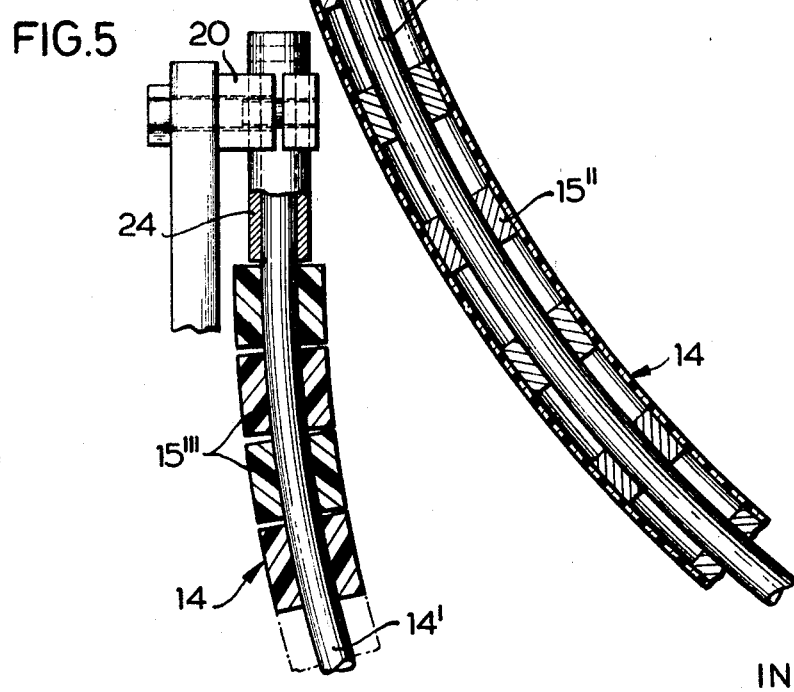
FIG. 4
FIG. 5
INVENTOR
Hartmut UPMEIER

GAUGING OR CALIBRATING DEVICE FOR TUBULAR FILMS

The invention relates to a gauging or calibrating device for use in production plants for tubular films using the blowing process, in which the film of flexible tubing is cooled by air after emerging from the film-blowing head.

In the production of tubular films of suitable thermoplastics, such as polyethylene, the demands on the operational efficiency of tubular film extrusion plants as well as on the adherence to manufacturing tolerances of the films have constantly risen.

In addition to extremely fine thickness tolerances in the production of the films, in the further treatment of such tubular films, in particular in the case of further processing of thick-walled tubular films into self-supporting plastics bags, very fine width tolerances of the lay-flat film of flexible tubing are required in order to ensure trouble-free further processing in the production of bags.

Since the stretching, that is, the blowing of the film of flexible tubing is effected in the still plastic zone of the hot tubing, while the measurements of the film of flexible tubing are undertaken after the "freezing line" (hardening line of the hot film of flexible tubing) has been reached, the cooling and gauging of the film of flexible tubing are closely linked with one another.

For solving this problem various devices have become known:

Sensing appliances measure the diameter of the film of flexible tubing or the width of the lay-flat film of flexible tubing according to the delivery arrangement and control the supply of air from the blower via suitable adjustable members and valves. The high inertia of this system is disadvantageous, particularly since it is not possible to prevent variations in diameter of the film of flexible tubing.

For the cooling and gauging of the tubular film, jacket cylinders have been employed which enclose the tubular film from outside. These jacket cylinders are as a rule water-cooled. Through localization of heat in the cylinder wall these become so hot however, that the film adheres to it on contact.

In a modified arrangement of this system the cooling liquid was allowed to pass directly between the tubular film and the inside of the jacket cylinder wall. However, owing to the abrupt cooling occurring here, there results, especially with thick-walled material, films with poor usage qualities, in particular with low shock resistance and poor welding properties.

Water-cooled inner mandrels for cooling and gauging the inside of the tubular film have also been used. Here however the same difficulties arise as with external water-cooled jacket cylinders, the strength of the film being made even worse by frozen-in contraction strains.

Cooling of the films by air has provided to be particularly advantageous for the film properties, since it does not act as abruptly as water-cooling and it therefore makes it possible to remove from the still plastic tubular film the stresses caused by flow deformations in the extrusion orifice, so that the physical properties of the film can be improved.

This invention has the object of obviating the disadvantages of the known processes and devices for gauging tubular films and to provide a device, with which it is possible with simple means, to gauge or calibrate in its diameter the still plastic and hot film of flexible tubing using air-cooling, in such a way, that it is possible to keep safely to the fine width tolerances of the lay-flat tubular film necessary for the further processing into plastics bags, wrappers and the like.

This object is achieved in accordance with the invention, in that the film of flexible tubing is completely surrounded in its still plastic region after emerging from the film-blowing head, by a number of support rings arranged one above the other at wide intervals, each of which rings consists of a spindle, bent in a circle with a covering which can rotate on it and which is heat resistant and nonadhesive.

It has been found, that the support of the tubular film by individual rings with a rotatable covering and arranged at wide intervals from one another is sufficient to obtain a tubular film with constant dimensions keeping to extremely fine diameter tolerances. Through the arrangement of the support rings at common intervals, the cooling air comes into direct contact with the film surface to be cooled, while the rotatable covering of the individual rings prevents the still plastic, rubbery elastic film from being uncontrollably retarded and stretched. The film heat superficially absorbed by the rotatable ring covering is dissipated during the further rotation of the covering in the cooling air flowing past, so that the rotatable ring covering assists the cooling of the film without any localization of heat, and without having however the abrupt cooling effect of water-cooled contact cylinders or tube coils.

The gauging device according to the invention can be used both in the hitherto conventional film-blowing installations with exterior cooling by cooling rings with air duct casing and interior cooling by airblast flow. The support rings do not only enable however a vertical guidance of the flexible tubing upwards or downwards, but also in any direction desired, in particular also in horizontal direction, as the support rings take up the downward-acting weight of the blown flexible plastics tubing. A horizontal guidance has the great advantage that no higher-than-average working spaces and support frameworks with ladders are needed, and that such an installation can also be erected and operated in normal low working spaces where it is easily accessible and supervisable.

Further objects and advantages of the invention will appear from the following description of preferred embodiments, represented diagrammatically in the drawing, of a gauging device. In the drawings:

FIG. 3 shows such a support ring in a construction having two divisions and FIGS. 4 and 5 show different forms of construction of the rotatable covering on such support rings.

Figure 1:
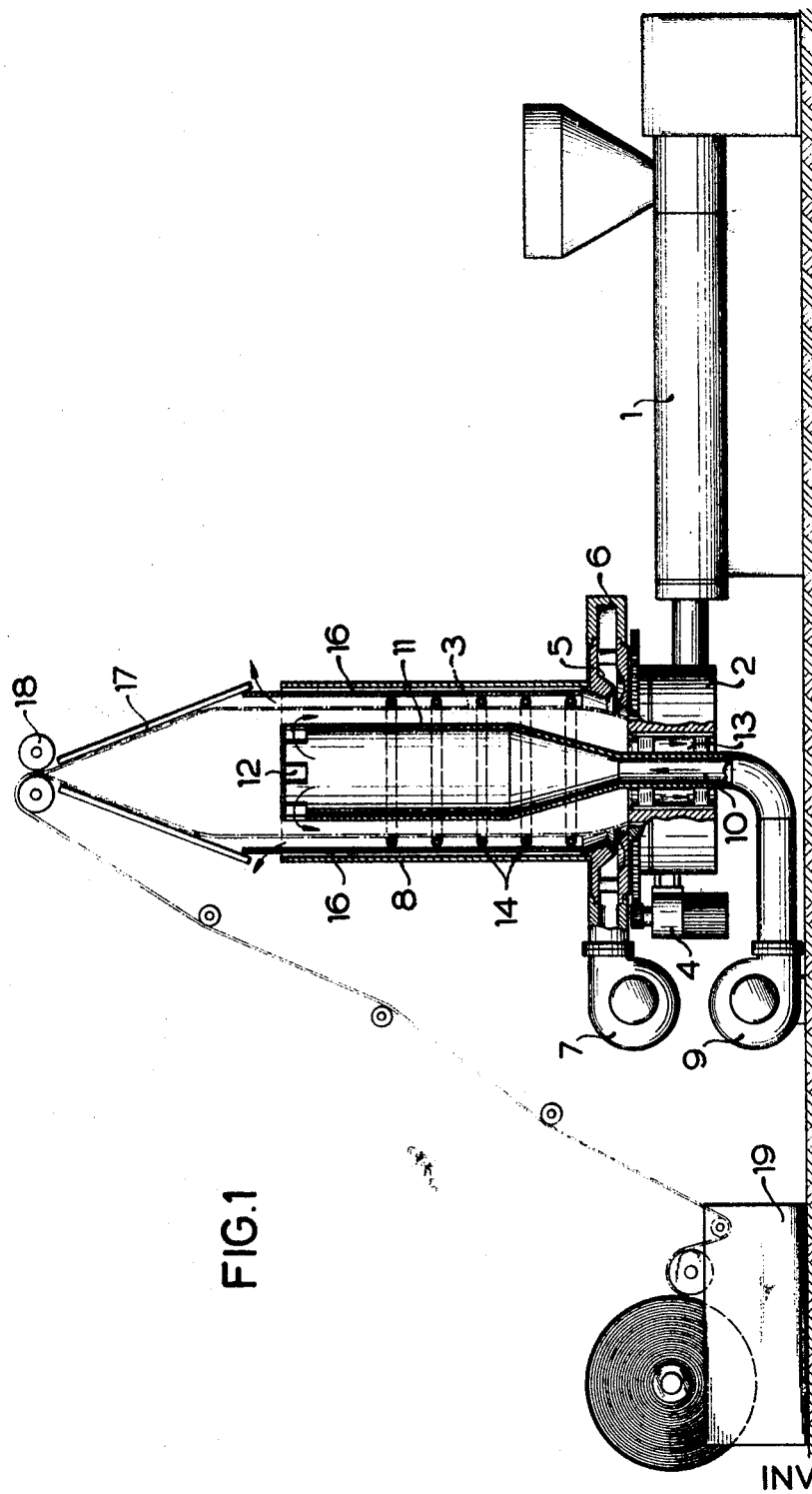
FIG. 1 shows a tubular film blowing plant with interior and exterior cooling of the tubular film by airflow, provided with a gauging device embodying the invention.

In the tubular film-blowing plant shown in the drawing, the plastics melt fed by a screw extruder 1 is formed by a film-blowing head 2 into a tubular film 3. The orifice or nozzle insert of the film-blowing head 2 is preferably rotatable and is driven by a geared motor 4 shown only diagrammatically. Above the film-blowing head 2 there is arranged a cooling ring 6 preferably provided with a rotating inner part 5, cooling air being fed to the ring by means of a blower 7. On the rotating inner part 5 of the cooling ring 6 there is arranged a detachable cylindrical casing 8, which surrounds the tubular film 3 with a small clearance.

The tubular film 3 emerging from the film-blowing head 2 is cooled inwardly by flowing cooling air, which is conducted from a blower 9 through a central tube 10, 11 and through apertures 12 at the upper end of the tube it flows downward in opposite direction inside the tubular film 3 then going through an annular duct 13 concentric to the tube 10 it passes into the rotating orifice or nozzle insert of the film-blowing head 2 through which it emerges into the open air.

The tubular film is surrounded by several support rings 14, arranged at a given common distance and each provided with a rotatable covering 15, which rings are connected by holding rods 16 to a stationary part of the tubular film-blowing plant, for example to the lay flat plates 17 or to their support means (not shown).

The tubular film laid flat by the plates 17 is subsequently drawn off in known manner by a pair of drawoff rolls 18 and then reeled up by a winding-on device.

Figure 2:
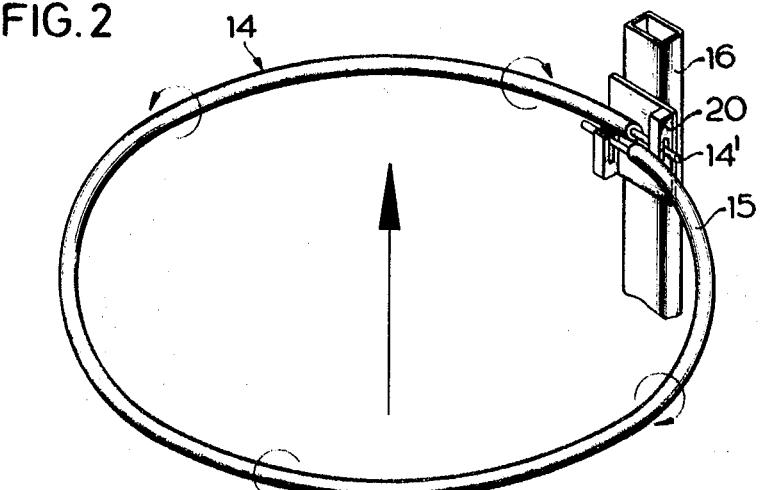
FIG. 2 shows a support ring of the gauging device provided on such a film-blowing plant, in a construction having a single division.
Figure 3:
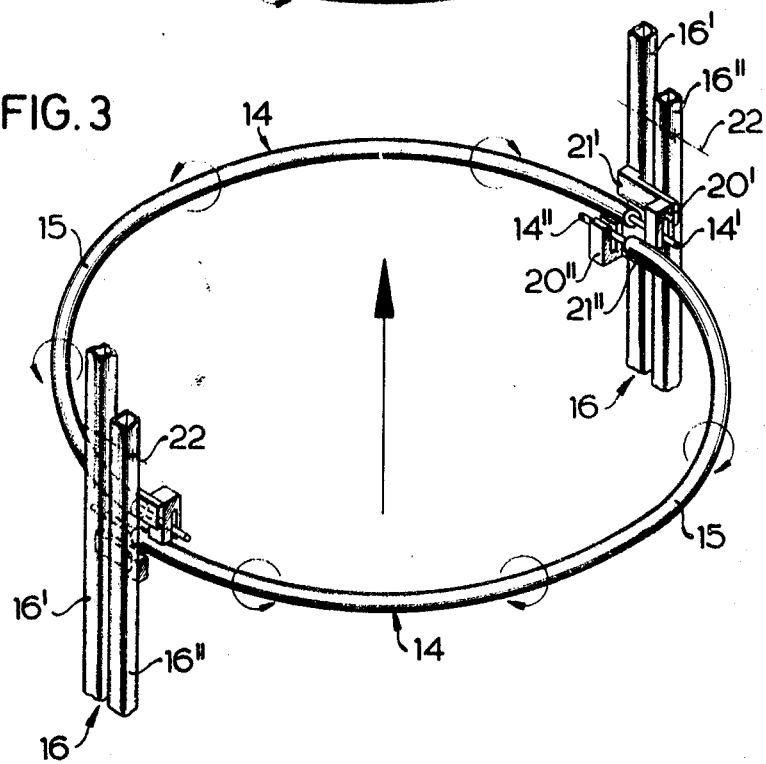

FIGS. 2 and 3 each show a representation in perspective of a support ring with its holding arrangement and a portion of the holding rod or rods 16. The support ring 14 with a single division according to FIG. 2 an be advantageously be used in practice with all installations without an interior cooling device, while the support ring 14 divided in two places according to FIG. 3 is advantageous if improved accessibility is required to an existing interior cooling device.

The support ring 14 divided in one place, as in FIG. 2, has spindle 14' formed from a curved rod, which spindle carries a rotatable annular covering 15 and is connected via clamping holders 20 to the holding rod 16 only part of which is shown. As the support ring 14 is only divided once, only one holding rod 16 is needed in this form of construction, which rod is made correspondingly resistant to bending.

In the case of the support ring 14 divided in two places in accordance with FIG. 3, at least two holding rods 16 are needed, which are here formed as two pairs of holding rods. Each pair of holding rods comprises a rear holding rod 16', which is fastened to a stationary part of the tubular film-blowing plant, and a front, detachable holding rod 16" in this case need only to correspond to the total height of the extent or range of the film-blowing plant provided with support rings 14. The semicircularly bent spindles 14', 14" of the support ring halves with their rotatable coverings 15 are fastened via clamping holders 20', 20" and cranked, rearward engaging straps 21', 21" against the holding rods 16', 16", so that the hindmost of the two support ring halves is carried via the clamping holders 20' and the straps 21' by the two rear stationary holding rods 16' and the front support ring half is carried via the clamping holder 20" and the straps 21" by the two front, detachable holding rods 16". This holding arrangement enables a trouble-free dismounting of the complete front support ring halves after loosening the connecting members (only shown diagrammatically by the centerlines 22) between the holding rods 16" and the holding rods 16', in order to make the inner space between the support rings accessible. The releasable connection between the holding rods 16', 16" can for example be made in the form of simple fastening screws or in the form of setscrews for the adjustment of the common distance between the holding rods 16', 16". In the latter case the support ring halves can be set closer or wider by adjusting the setscrews, in order to regulate the gauging of the tubular film in a simple manner for all the support rings together. For this purpose the holding arrangement of the two ends of the support rings 14 with one division in accordance with FIG. 2 can also be correspondingly constructed.

FIG. 4 shows in a partial longitudinal view through a support ring 14, a possible construction of the rotatable covering 15, which consists in this embodiment of a thin-walled tube 15', of a flexible, heat-resistant and nonadhesive material, such as silicon rubber. On the spindle 14' there are arranged in this form of embodiment freely rotating support rollers 15", which support the tube 15" at a such distance that it is not deformed by the pressure of the blast acting in the tubular film 3, when the tubular film 3 is supported against the support ring 14. The lateral guidance of the rotatable covering 15 on the spindle 14' is effected for instance by end bushes 24, which are connected with the spindle 14' and are held with the latter by the clamping holder 20.

In FIG. 5 there is represented a further embodiment of the rotatable covering 15 of the support rings, which can be employed when thicker and more insensitive films are being produced. In this embodiment the rotatable covering comprises individual rollers 15''' arranged closely adjacent one another, which are made of a freely running, heat-resistant and nonadhesive material, preferably polytetrafluoroethylene, which also has a low coefficient of friction.

The length of the rotatable covering 15 of the support rings 14 is such that the ends of the rotatable coverings 15 come to be exactly superposed, so that the tubular film is enclosed and supported without interruption over its entire periphery. In addition this arrangement offers the great advantage that, by shifting the ends of the spindles 14' with the end bushes 24 fastened on them in the clamping holders 20, 20', 20", the circumference of the supports rings can be infinitely varied within certain limits, so that the variable shrinkage behavior of the tubular film possibly caused by the subsequent further cooling or by the other influences can be accurately compensated, in order to produce tubular foils, which in the lay-flat state have an exactly constant width.

If a greater adjustment is needed, then in the case of the arrangement according to FIG. 5 some of the rollers 15''' can be removed or added, or in the arrangement in FIG. 4 shorter or longer flexible tubes 15' can be incorporated with a corresponding number of support rollers 15". With even greater variations in the dimensions of the tubular film, the support rings 14 can easily be exchanged for others with suitable rotating coverings 15.

What I claim is:

1. In a production plant for tubular films using the blowing process in which a film of flexible tubing is cooled by air after emerging from the film-blowing head, a gauging or calibrating device comprising:
   a. a plurality of support rings surrounding the tubular film in its still plastic region after emerging from the blowing head,
   b. said support rings being arranged at wide intervals with respect to each other, and
   c. each said support ring comprising
      i. a spindle bent in a circle and
      ii. a heat-resistant and nonadhesive covering which can rotate on said spindle.

2. The invention as claimed in claim 1, wherein the rotatable covering of each support ring comprises a thin-walled flexible tube of heat-resistant nonadhesive material, such as silicon rubber, which is supported on the spindle of the ring by means of free-running support rollers.

3. The invention as claimed in claim 1, wherein the rotatable covering of each support ring consists of individual rollers arranged closely adjacent one another of a heat-resistant, nonadhesive material with a low coefficient of friction, such as polytetrafluoroethylene.

4. In a production plant for tubular films using the blowing process in which a film of flexible tubing is cooled by air after emerging from the film-blowing head, a gauging or calibrating device comprising:
   a. a plurality of support rings surrounding the tubular film in its still plastic region after emerging from the blowing head,
   b. said support rings being arranged at wide intervals with respect to each other
   c. each said support ring comprising
      i. s spindle bent in a circle and
      ii. a heat-resistant and nonadhesive covering which can rotate on said spindle, and
   d. each said support ring being divided in one place and being fastened by means of
   e. infinitely adjustable holding devices each on two rods.

5. The invention as claimed in claim 4, wherein the rotatable covering of each support ring comprises a thin-walled flexible tube of heat-resistant nonadhesive material, such as silicon rubber, which is supported on the spindle of the ring by means of free-running support rollers.

6. The invention as claimed in claim 4, wherein the rotatable covering of each support ring consists of individual rollers arranged closely adjacent one another of a heat-resistant, nonadhesive material with a low coefficient of friction, such a polytetrafluoroethylene.

7. In a production plant for tubular films using the blowing process in which a film of flexible tubing is cooled by air after emerging from the film-blowing head, a gauging or calibrating device comprising:
   a. a plurality of support rings surrounding the tubular film in its still plastic region after emerging from the blowing head,
   b. said support rings being arranged at wide intervals with respect to each other
   c. each said support ring comprising
      i. a spindle bent in a circle and ii. a heat-resistant and nonadhesive covering which can rotate on said spindle,
d. each said support ring being divided in two places,
e. two pairs of holding rods,
f. rearward engaging straps on two holding rods of said two pairs of holding rods, and
g. a plurality of infinitely adjustable holding devices each fastening one of said support rings to said two holding rods by means of said straps.

8. The invention as claimed in claim 7, wherein the holding rods of each pair are connected together by means of connecting members which can be adjusted in their distance from each other and are easily separable.

9. The invention as claimed in claim 7, wherein the rotatable covering of each support ring comprises a thin-walled flexible tube of heat-resistant nonadhesive material, such as silicon rubber, which is supported on the spindle of the ring by means of free-running support rollers.

10. The invention as claimed in claim 7, wherein the rotatable covering of each support ring consists of individual rollers arranged closely adjacent one another of a heat-resistant nonadhesive material with a low coefficient of friction, such as polytetrafluoroethylene.